Sept. 21, 1943.                W. H. LEHMBERG                 2,330,127
                        RESPIRATOR AIR-LINE VALVE
                         Filed Nov. 3, 1941
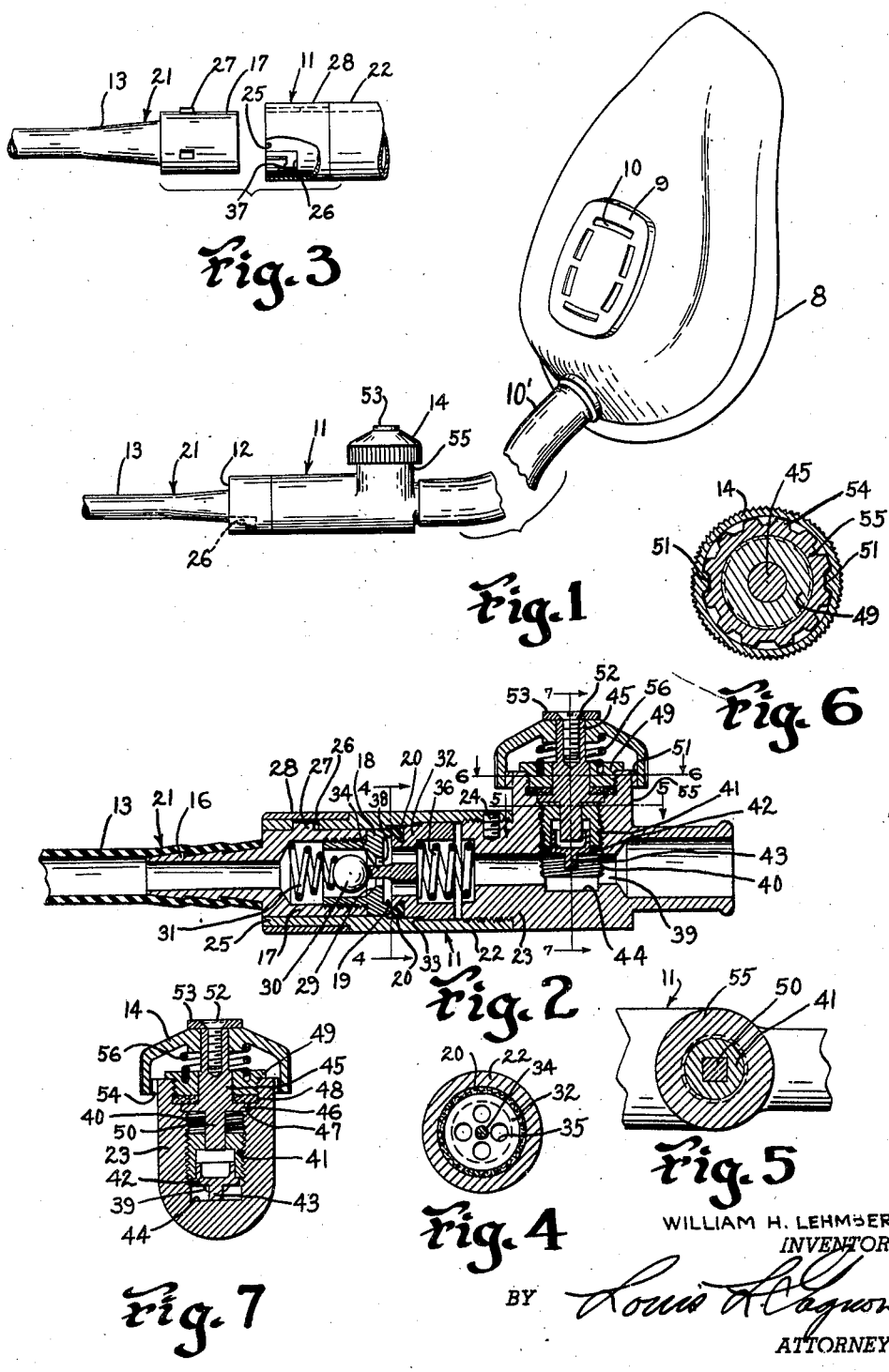
WILLIAM H. LEHMBERG
INVENTOR Patented Sept. 21, 1943

2,330,127

UNITED STATES PATENT OFFICE 2,330,127

RESPIRATOR AIR-LINE VALVE

William H. Lehmberg, Dudley, Mass., assignor to American Optical Company, Southbridge, Mass., a voluntary association of Massachusetts Application November 3, 1941, Serial No. 417,645

5 Claims. (Cl. 138—46)

This invention pertains to respirator equipment and more particularly to an air-line valve which may be used in conjunction with a respirator of the supplied-air type.

One of the objects of the invention is to provide a novel air line valve having automatic locking means for positively securing the valve adjustment means in the desirable position.

A further object of the invention is to provide an air line valve with novel coupling means for securing the air line to a manually operable valve control with means on the valve control for automatically locking same in a predetermined position.

A further object of the invention is to provide a manually operable valve with an adjustable valve plug slidably connected to a valve stem, which stem normally restores to a predetermined position regardless of the location of the valve plug in relation to the valve stem.

A further object of the invention is to provide an air line valve for connecting an air line hose to a respirator with novel means for providing a leak proof resilient connection between the hose connector and the air line valve with a novel means in the valve to afford a minimum flow of air therethrough at all times.

A further object of the invention is to provide a more durable air line valve and hose connecting means which is more precise in construction and more positive and efficient in operation.

Further and other objects may be and may become apparent to one skilled in the art from a perusal of the drawing and the annexed specification, and it is to be understood that changes and modifications may be made within the spirit of the invention as defined by the subjoined claims:

In the drawing:

Fig. 1 is a perspective view of a respirator of the supplied-air type in combination with the manually operable air line valve and the air hose coupling means.

Fig. 2 is an enlarged cross sectional view of the valve member shown in Fig. 1.

Fig. 3 is an exploded side view partly broken away of the air hose coupling and a portion of the air line valve.

Fig. 4 is a sectional view taken along lines 4—4 of Fig. 2.

Fig. 5 is a sectional view taken substantially along lines 5—5 of Fig. 2.

Fig. 6 is a sectional view taken substantially along lines 6—6 of Fig. 2 showing a portion of the locking means for preventing accidental variation in the valve adjustment.

Fig. 7 is a sectional view taken along lines 7—7 of Fig. 2 showing the minimum air flow passage.

Referring to the drawing and more particularly to Fig. 1, 8 is a face mask of an air line respirator with a cover plate 9 having apertures 10 therein to permit the egress of air through the valve located below the valve cover 9. A hose 10' connects an air line valve 11 with the face mask 8. A hose coupling 12 connects a hose 13 with the valve 11. An adjustment knob 14 is rotatable within the valve 11 to control the air supply through the valve into the face mask 8.

In Fig. 2, the air line hose 13 is shown slipped over the end of a barbed stem 16 which has an enlarged cup 17 which threadedly engages a ball retained nut 18 on the opposite end thereof, said nut having a circular shoulder 19 which engages a synthetic rubber washer 20, said washer and shoulder being in positive engagement to prevent an air leak therebetween when the air hose coupling 21 is in operative engagement with the valve 11. The sleeve 22 is threadedly connected to the valve body 23 and may have a screw 24 for locking said sleeve in fixed position with the valve body. The free end of the sleeve 22 has a reduced portion 25 with a bayonet slot 26 located therein, which slot may be more clearly seen in Figs. 1 and 3. A series of lugs 27 slip into the bayonet slot 26 and may be locked in position as shown by the arrangement of parts in Fig. 3. A collar 28 is snugly fitted onto the free end 25 of the sleeve 22 so that when the coupling 21 is in operative connection with the valve 11, the bayonet slot connection is substantially obscure from external appearance.

The enlarged cup 17 has a ball seat 29 which is covered by a ball 30 which is pressed against the seat 29 by the action of the spring 31 when the hose coupling 21 is disengaged from the valve 11. A plunger 32 slidably fits within the sleeve 22 and is limited in axial movement by the valve body 23 and a shoulder 33 on the sleeve 22. A valve stem 34, also shown in Fig. 4 is an integral part of the plunger 32 having holes 35 located between the stem 34 and the body of the plunger 32 for the purpose of permitting air to pass through the openings 35. A spring 36 engages the valve body 23 and a surface of the plunger 32 so that the spring 36 normally forces the plunger 32 away from the valve body 23 against the shoulder 33 when the valve is disconnected from the coupling 21.

When the coupling 21 is disconnected from the valve 11, as shown in Fig. 3, the ball 30 engages the ball seat 29 under action of the spring 31 so that the air pressure flowing through the hose 13 will not be permitted to pass through the opening 38 in the end of the ball retainer nut 18. It will be seen that the moment the coupling is disconnected from the valve 11, the air flow from the end of the coupling 21 is shut off by the action of the spring pressed ball 30.

In connecting the coupling 21 to the valve 11, the coupling is inserted within the sleeve 25 with the lugs 27 engaging the bayonet slots 26. In order to get the lugs 27 into the locking recess 37 (Fig. 3) the shoulder 19 of the ball retainer nut 18 engages the leather washer 20 and forces the plunger 32 toward the valve body 23. After the coupling is rotated so that the lugs 27 engage the locking recess 37 in the bayonet slot 26, the spring 36 forces the plunger 32 away from the valve body so that there is a tight connection between the shoulder 19 of the ball retainer nut and the leather washer 20. As soon as the stem 34 of the plunger 32 engages the ball 30 and the coupling 21, the ball becomes unseated to permit the air flow through the coupling and valve into the face mask 8. It will be seen from the above description that the coupling operation will have an air tight connection between the coupling and the valve after the ball 30 is unseated by the stem 34 and that the slight movement of the coupling 21 away from the valve body 23 will permit the plunger 32 to follow so that the connection between the shoulder 19 and the washer 20 prevents any air leakage between the coupling and the sleeve 22.

In Fig. 4, the leather washer 20 is shown engaging the sleeve 22 and is the seat for the shoulder 19 of the ball retainer nut 18.

The valve body 23 has an axial hole 39 therethrough which is interrupted by a threaded portion 40 which receives the threaded valve plug 41. A plug cap 42 is snugly fitted into the end of the valve plug 41 and has a limiting member 43 as an integral part of the plug cap 42. The limiting member 43 on the end of the plug cap 42 is a restricting means to prevent the valve plug 41 from completely shutting off the air supply in the passage 39 when the valve plug is in its lowered position to permit a minimum air flow through the passage 39 into the face mask.

Referring to the sectional view in Fig. 7 and the valve portion of Fig. 2, the limiting member 43 is shown engaging the bottom wall 44 with the air passage 39 being shown thereabove. Particularly referring to Fig. 7, it will be seen that the air passage 39 is not closed by the valve plug 41 since the bottom wall 44 is engaged by the limiting member 43 while the passage 39 is still visibly partially open. The valve stem 45 has a collar 46 about midway of its length. The collar rests on a shoulder 47 and has a washer 48 such as leather above the collar, which washer is held in place by a nut 49 which nut is threadedly connected to the upper housing 55 of the valve body 23. The washer 48 provides an air tight connection between the air passage 39 and the exterior of the valve along the valve stem.

The lower portion of the valve stem 50 is square in a cross section thereof which may be more clearly seen in Fig. 5. A square hole in the top of the valve plug 41 slidably receives the square portion of the stem 50. When the knob 14 is turned, the stem 45 rotates but does not move axially. The rotation of the knob 14 is slidably connected to the upper end of the stem 45 and is limited by a screw 52 and a washer 53. The rotation of the knob 14 causes the plug 41 to rotate with the square portion of the stem 50. Since the plug 41 is threadedly connected to the threads 40 in the valve body 23, the rotation of the stem 50 will cause the plug 41 to be either raised or lowered since the stem 50 is slidably connected to the valve plug 41.

Referring to Fig. 6, a number of teeth 54 are shown spaced about the upper housing 55 of the valve body 23. The knob 14 has two teeth 51 on the inside thereof and are complemental with the teeth 54. The knob teeth 51 are oppositely disposed and may be moved to any position around the knob so that they can fit in between any pair of adjacent teeth 54. A spring 56 is compressed between the nut 49 and the underneath surface of the knob 14 so that the knob 14 is normally urged against the washer 53. When it is desirable to adjust the air flow through the valve, the knob 14 shown in its fully retracted position in Fig. 2 is pressed downwardly so that the teeth 51 on the inside of the knob disengage the teeth 54 on the part 55. The knob may then be turned which accordingly rotates the valve stem and the valve plug 41 so that the valve plug may be moved in a clockwise direction until the limiting member 43 reaches the bottom wall 44 as shown in Fig. 7. In this position the valve is closed as far as possible, being limited only by the limiting member 43 in engaging the bottom wall 44.

The rotation of the knob 14 cannot take place unless the spring 56 has been compressed, and the teeth 51 disengaged from the teeth 54. After the valve has been desirably adjusted, the downward pressure on the knob 14 is released and the spring 56 forces the knob 14 against the washer 53 provided the teeth 51 are in position to mesh with the teeth 54 on the upper housing 55. If the teeth 51 and 54 are not in suitable registering position, a slight twist of the knob either one side or the other will bring the teeth into registration and the spring 56 will snap the knob upwardly to engage the washer 53.

It will therefore be seen from the above description of the valve that the adjustment may be made to control the air flow through the passage 39 and that after the adjustment is made the knob 14 automatically locks in its fully retracted position while the valve plug may remain in any predetermined position by adjustment of the valve knob.

From the foregoing, it will be seen that a coupling 21 has a valve to prevent air from passing therethrough when the coupling is disconnected from the valve 11 proper. It will also be seen that the connecting of the coupling 21 with the valve 11 automatically opens the valve within the coupling. It will further be seen that there is a means in the valve to at all times permit a minimum flow of air through the valve so that when the air pressure is supplied to the hose, there is no period in which a minimum amount of air is not being supplied to the face mask 8. The adjustment means on the valve stem for controlling the flow of air is automatically self locking so that there can be no accidental variation in the value adjustment without pressing the knob prior to rotating the vale stem.

Having described my invention, I claim:

1. A valve of the class described comprising a valve body with an air passage therethrough, a gate having a preshaped aperture therein and being threadedly connected in said valve body to effect substantial closure of said air passage, a valve stem having one end thereof preshaped to slidably engage the preshaped aperture in the gate, the opposite end of said valve stem having a spring actuated adjustment member slidably mounted thereon to permit rotation of said valve stem, adjustable locking means for securing said adjustment member in various positions in relation to the valve body, and bearing means for said valve stem to permit rotation of said stem for effecting closure of the valve gate while holding said valve stem against any appreciable axial movement.

2. A valve of the class described comprising a valve body with an air passage therethrough, a gate having a preshaped aperture therein and being threadedly connected in said valve body to effect substantial closure of said air passage, a valve stem having one end thereof preshaped to slidably engage the preshaped aperture in the gate, the opposite end of said valve stem having a spring actuated adjustment member slidably mounted thereon to permit rotation of said valve stem, adjustable locking means for securing said adjustment member in various positions in relation to the valve body, collar means on said valve stem, and bearing means engaging said collar means on opposite sides thereof to permit rotatable movement of said stem and restrain any appreciable axial movement of said stem.

3. A valve of the class described having a valve body with a threaded portion for receiving a valve plug, a valve plug having a preshaped aperture therein for threaded engagement with the threaded portion of the valve body, a plug cap snugly fitted into one end of the valve plug, which plug cap has a limiting means thereon to prevent the valve plug from completely closing the air passage, a valve stem having one end thereof preshaped for slidably engaging the preshaped aperture in the valve plug and having a collar about midway of its length, a shoulder on the valve body for impinging one side of said collar, securing means for rotatably holding said collar against said valve body shoulder, an adjustment knob slidably connected with the end of said valve stem opposite the preshaped end thereof, spring actuated means to urge said adjustment knob toward one end of said valve stem, a protuberance on said adjustment knob, and a plurality of teeth secured to the valve body for selectively engaging the knob protuberance with certain of said teeth to prevent the valve stem from rotating when the adjustment knob protuberance is in engagement with certain of said teeth.

4. A valve of the class described comprising a valve body with a passageway therethrough and having an integral portion with a threaded bore intersecting said passageway and terminating in a valve seat and having engagement means thereon, a gate member threadedly connected with the threaded bore and being movable to effect substantial closure of said passageway, a valve stem member supported to extend within the threaded bore, one of said members having a preshaped opening therein and the other a preshaped portion to slidably engage in said opening whereby the rotation of the valve stem will cause said gate to be rotated, an adjustment knob carried by said valve stem member and having engagement means for engaging the engagement means of the integral portion having the threaded bore therein and being movable to positions for engaging and disengaging the engagement means and resilient means for normally retaining said adjustment knob in a position whereby the engagement means thereof is engaged with the engagement means of the integral portion.

5. A valve of the class described comprising a valve body with a passageway therethrough and having a portion with a threaded bore intersecting said passageway and terminating in a valve seat, said portion having interlocking means thereon, a gate having a preshaped aperture therein and being threadedly connected in said threaded bore to effect substantial closure of said passageway, a valve stem having one end thereof preshaped to slidably engage the preshaped aperture in the gate, an adjustment knob on said valve stem having interlocking means adapted to interlock with the interlocking means on the portion having the threaded bore therein, resilient means for normally urging said adjustment knob in a direction to engage the interlocking means of said knob with the interlocking means on the portion having the threaded bore therein and said gate having a projection portion for engaging the base of the valve seat to limit the extent of closure of the passageway by said gate whereby complete closure of said passageway can not be effected.

WILLIAM H. LEHMBERG.